Aug. 7, 1923.
A. B. DRAGER
PRESSURE GAUGE CONNECTION
Filed June 9, 1921
1,463,804
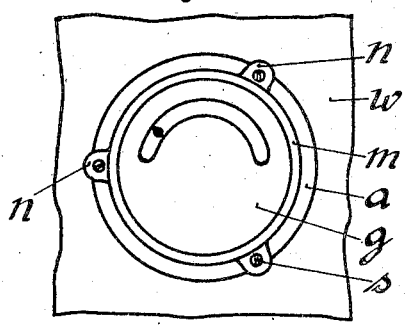
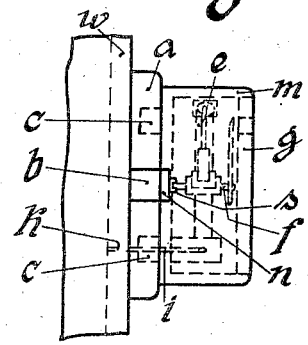
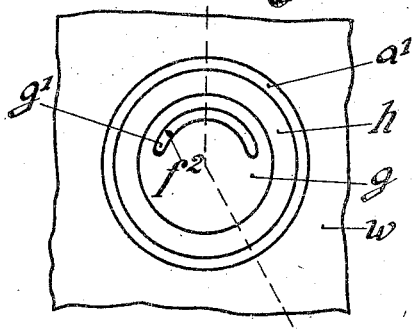
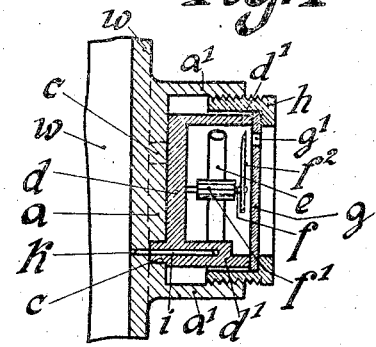
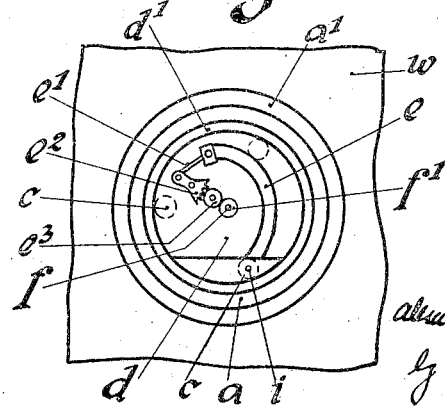

Patented Aug. 7, 1923.

1,463,804

UNITED STATES PATENT OFFICE.

ALEXANDER BERNHARD DRÄGER, OF LUBECK, GERMANY.

PRESSURE-GAUGE CONNECTION.

Application filed June 9, 1921. Serial No. 476,234.

*To all whom it may concern:*

Be it known that I, ALEXANDER BERNHARD DRÄGER, a citizen of Germany, residing at Lubeck, Germany, have invented certain new and useful Improvements in Pressure-Gauge Connections, of which the following is a specification.

Hitherto pressure gauges have been connected by a pipe to the vessel, the internal pressure of which had to be measured, the said pipe being connected to the vessel by a screw-thread. This method of connection necessitates the use of a complicated packing, it is cumbersome and is particularly unsuitable where a compact construction of the parts is necessary and where a well protected or sheltered arrangement of the pressure gauge is desired.

This invention has for its object to provide a pressure gauge connection free from the above-mentioned drawbacks and which is therefore particularly suitable for high pressure gases, for instance for tanks, accessories and piping for compressed oxygen.

According to this invention, the wall of the vessel, pipe or the like to be provided with a pressure gauge, is provided with a bed or seat, whilst the back or bottom of the pressure gauge fits on the seat. The gauge is secured to the seat for instance by flanges and screws, so that an aperture in the back of the gauge and communicating with the gauge spring-tube registers with an aperture in the seat and leading into the vessel.

The seat can be formed particularly when it is desired to afford an increased protection to the pressure gauge, with a surrounding wall, that is to say made in the form of a cup. In the said cup or socket the pressure gauge or a complete pressure gauge gear is introduced, so that the back of the gauge is pressed against the bottom of the cup by a cover screwed on or into the mouth of the cup.

For ensuring a reliable immovable connection between the pressure gauge and the seat or cup, the back of the pressure gauge is provided with at least two, but preferably three projections or pins engaging with corresponding recesses in the seat or in the bottom of the cup. The aperture leading to the pressure gauge spring-tube is then preferably passing longitudinally through one of the pins.

Two constructions according to the invention are illustrated by way of example in the accompanying drawing:—

Figures 1 and 2 show in two views at right angles to each other, a seat on a wall of a vessel, with the pressure gauge secured thereto, without the assistance of a pipe.

Figures 3 and 4 show in front elevation, and in vertical section on line A—B of Figure 3, a connection cup or socket in which is secured a pressure gauge.

Figure 5 is a front view, on somewhat larger scale, of Figure 3, showing the pressure gauge gear as it appears after the removal of the screw cover and the dial.

Similar letters of reference refer to similar parts throughout the several figures.

According to the construction shown in Figures 1 and 2, the back of the pressure gauge $m$ constitutes the connection surface, and it is secured in axial direction on the seat $a$ of the vessel wall $w$. It is held by screws $s$ in lugs $n$ on the pressure gauge casing and in shoulders or offsets $b$ (Fig. 2) on the seat. Through the wall $w$ and the seat $a$ is an aperture $k$, and through the bottom of the pressure gauge an aperture $i$ connected to the pressure gauge spring-tube $e$ which in the known manner turns a suitable transmitting gear and the index spindle $f$ relatively to a dial $g$.

The pressure gauge must be placed of course on the seat in such a manner that the mouths of the apertures $k$ and $i$ coincide. If desired, dowel pins can be provided, the back of the pressure gauge engaging by means of one or more pins with corresponding recesses in the seat. Two such pins $c$ are shown in Figure 2. The aperture $i$ passes in this construction longitudinally through one of the pins $c$.

According to the construction shown in Figures 3, 4 and 5, the seat $a$ is provided with a wall to form a cup or socket $a^1$. In the said cup there is inserted a complete pressure gauge, chiefly constituted by a back plate $d$ with a surrounding wall $d^1$ forming a cup, a spring tube $e$, an indicator spindle $f$ with gear $f^1$ and pointer or hand $f^2$, a dial $g$, with annular slit $g^1$ and a suitable transmitting gear between the end of the spring tube $e$ and the gear $f^1$. This transmitting gear may consist, for example of a connecting rod $e^1$ (Fig. 5), a segment wheel $e^2$, and a pinion $e^3$ engaging the gear $f^1$. The said pressure gauge being secured in the cup $a$, $a^1$ by an annular screw cover $h$, that is to say, pressed fast against the bottom *a* of the cup. The back plate *d* of the pressure gauge preferably engages by pins *c* with recesses in the cup bottom *a*. It is preferable in practice to use three such pins, as this ensures the most reliable fitting. The aperture *i* leading to the spring tube *e*, passes longitudinally through one of the pins *c*. This aperture registers with the aperture *k* passing through the cup bottom *a* or the vessel wall *w*.

In the construction shown in Figures 3 to 5, the connection cup or socket *a a¹* in combination with the screw cover *h* forms at the same time the outer casing for the pressure gauge gear arranged inside.

I claim:

1. The combination of a receptacle having a seat upon its outer surface provided with an eccentrically located aperture communicating with the interior of said receptacle and terminating at the outer face of said seat, a gauge including a casing having an integral end wall in surface engagement with said seat and provided with an eccentrically located aperture in registry with the aperture of said seat and communicating with the operating mechanism of said gauge, means whereby said apertures are maintained in registry with each other, and means whereby said gauge is clamped against said seat.

2. The combination of a receptacle having a seat upon its outer surface provided with a plurality of eccentrically located devices and with an eccentrically located aperture communicating with the interior of said receptacle, a gauge including a casing having an integral end wall in surface engagement with said seat, and provided with an eccentrically located aperture in registry with the aperture of said seat and communicating with the operating mechanism of said gauge, means on the end wall of the casing co-operating with said eccentrically located devices to prevent rotation of said casing about its axis relatively to said seat and means whereby said casing is clamped against the seat.

3. The combination of a receptacle having a seat upon its outer surface provided with a plurality of eccentrically located recesses and with an aperture communicating with the interior of said receptacle and terminating at the bottom of one of said recesses, a gauge including a casing having an integral end wall in surface engagement with said seat, a plurality of eccentrically located pins projecting from the end wall of said casing into said recesses to position the gauge upon said seat and to prevent relative rotation of said gauge, one of said pins being provided with an aperture adapted to register with the aperture of said receptacle and communicating with the operating mechanism of said gauge, and means for clamping the latter against said seat and for fixing the pins in said recesses.

4. The combination of a receptacle having a seat upon its outer surface provided with an eccentrically located recess and with an aperture communicating with the interior of said receptacle, an annular wall extending outwardly from said seat, a gauge located within said wall and including a casing having an end wall in surface engagement with said seat and provided with an aperture in registry with the aperture of said seat and communicating with the operating mechanism of said gauge, a pin projecting from said end wall of the casing into said recess to position the gauge upon said seat and to prevent relative rotation of said gauge about its axis within said annular wall, and an annular cover detachably connected with said annular wall and engaging said gauge to clamp it against said seat.

ALEXANDER BERNHARD DRÄGER.